United States Patent [19]
Schierling

[11] Patent Number: 5,931,735
[45] Date of Patent: *Aug. 3, 1999

[54] FLYWHEEL DEVICE WITH A SEAL

[75] Inventor: Bernhard Schierling, Kürnach, Germany

[73] Assignee: Fichtel & Sachs AG, Schweinfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/647,237

[22] Filed: May 9, 1996

[30]     Foreign Application Priority Data

May 11, 1995  [DE]  Germany .................. 195 17 290

[51] Int. Cl.⁶ ........................................... F16D 3/14
[52] U.S. Cl. ..................... 464/24; 464/68; 192/208
[58] Field of Search .................. 464/24, 64, 68, 464/66; 74/574; 192/208

[56]            References Cited

U.S. PATENT DOCUMENTS

| | | | |
|---|---|---|---|
| 4,351,167 | 9/1982 | Hank et al. ........................... | 464/24 |
| 4,850,244 | 7/1989 | Eckel et al. . | |
| 5,030,167 | 7/1991 | Jäckel . | |
| 5,048,658 | 9/1991 | Reik . | |
| 5,249,659 | 10/1993 | Fukushima ........................... | 464/24 X |
| 5,353,664 | 10/1994 | Yamamoto ........................... | 192/208 X |
| 5,355,747 | 10/1994 | Kajitani et al. ...................... | 192/208 X |
| 5,433,307 | 7/1995 | Jeppe ................................... | 464/68 X |
| 5,487,704 | 1/1996 | Friedmann et al. .................. | 464/24 |
| 5,536,208 | 7/1996 | Krumm ................................. | 464/24 |
| 5,569,008 | 10/1996 | Schierling et al. ................... | 464/64 |
| 5,617,940 | 4/1997 | Fukushima et al. ................ | 192/208 X |

FOREIGN PATENT DOCUMENTS

| | | |
|---|---|---|
| 26 96 518 | 4/1994 | France . |
| 3515928 | 11/1986 | Germany . |
| 37 21 711 | 1/1988 | Germany . |
| 3841639 | 12/1989 | Germany . |
| 41 28 868 | 3/1993 | Germany . |
| 4341372 | 6/1994 | Germany . |
| 9414314 | 1/1995 | Germany . |
| 2227809 | 8/1990 | United Kingdom . |
| 2288652 | 10/1995 | United Kingdom . |

*Primary Examiner*—Eileen Dunn Lillis
*Attorney, Agent, or Firm*—Cohen, Pontani, Lieberman & Pavane

[57]                  ABSTRACT

A flywheel device has a drive-side centrifugal mass and a second centrifugal mass, which is rotatable relative to the first centrifugal mass and is connected to the first centrifugal mass via a torsional damping device. At least one of the centrifugal masses has a grease chamber containing a viscous medium for accommodating, at least partially, the torsional damping device. A seal is associate with the grease chamber to hold back the viscous medium in the grease chamber. The seal is accommodated on one of the centrifugal masses and engages into the radial extension region of the other centrifugal mass. The seal extends into the grease chamber, and the side of the seal accessible to the viscous medium has an axial offset relative to the side facing the grease chamber of the wall that interacts with the seal of the centrifugal mass having the grease chamber. The axial offset is limited to the gap width, at least at the sealing point.

5 Claims, 2 Drawing Sheets

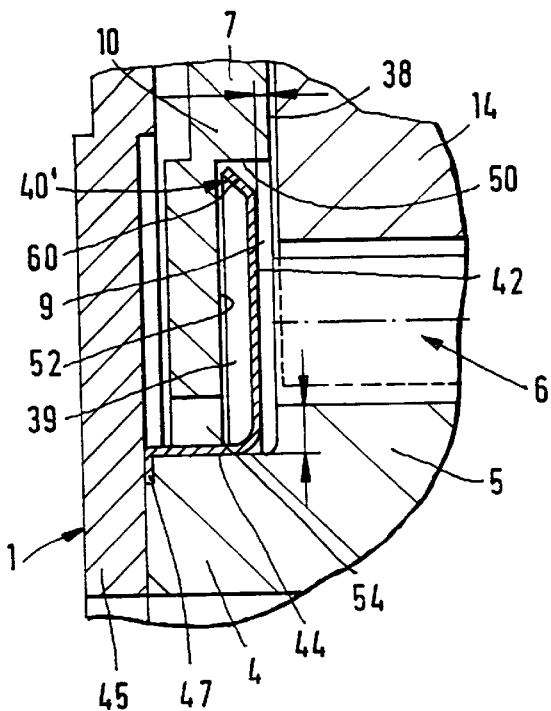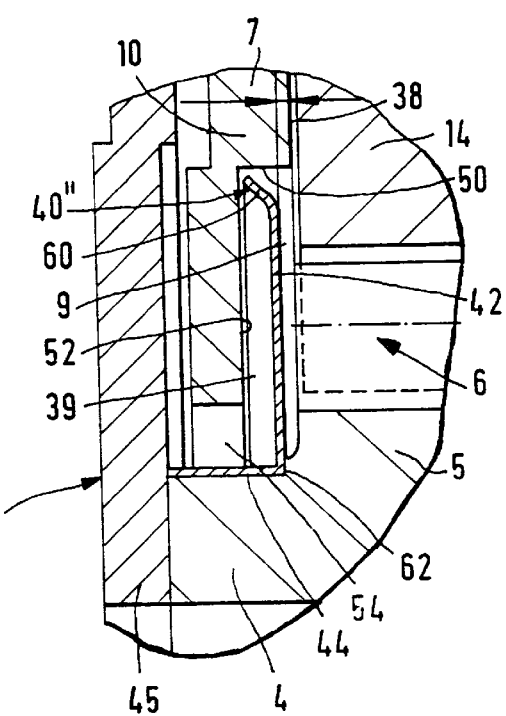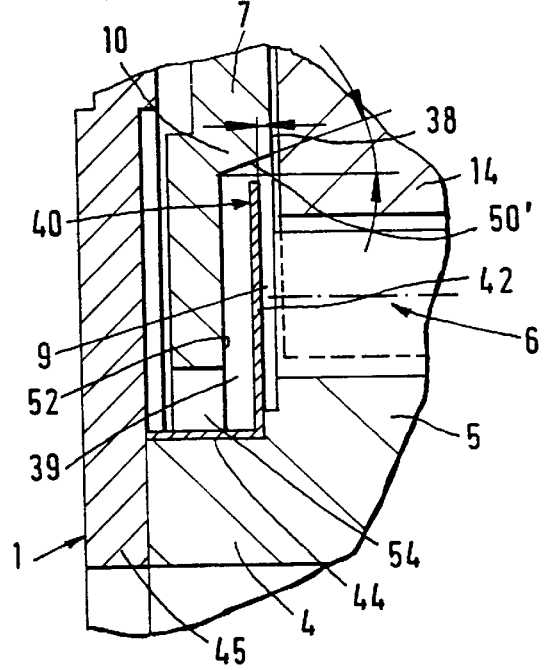

FLYWHEEL DEVICE WITH A SEAL

BACKGROUND OF THE INVENTION

1. Field of the Invention

The invention relates to a flywheel device, and more particularly to a flywheel device for motor vehicles.

2. Description of the Related Art

German reference DE GM 94 14 314, especially in FIG. 2 thereof, teaches a flywheel device in which a grease chamber is formed in an output-side centrifugal mass that serves to accommodate an internal gear, planetary gears and a sun gear attached firmly to a drive-side centrifugal mass. The aforementioned toothed gears constitute load-transmitting elements of a planetary gear system. At least one of the elements, for example, the internal gear, is attached to the output-side centrifugal mass and is connected to the drive-side centrifugal mass via a spring assembly of a torsional damping device, which acts upon the planetary carriers, via the latter as well as the planetary gears and the sun gear. The planetary carriers form a rough seal for the grease chamber, while cover plates arranged on both sides of the grease chamber and connected to a ring that encompasses the chamber radially are used to attain a fine seal. Although the left cover plate in FIG. 2 of this reference extends radially inward over the meshing region of the internal gear/planetary gears, it does not extend all the way to the meshing region of the planetary gears/sun gear. Thus, viscous medium contained in the grease chamber, which is displaced in the axial direction between the tooth flanks of the sun gear and the planetary gears when these toothed gears roll upon one another, is able to emerge from the grease chamber through gaps formed between the planetary carrier associated with this cover plate and a friction device. Furthermore, due to the centrifugal force arising during operation of the flywheel device, the viscous medium can move radially outward in an axial fashion between the drive-side centrifugal mass and the adjacent cover plate, where, although it could possibly be held back by means of a friction ring, it nonetheless changes the frictional properties of the latter considerably. In any case, this sort of emergence of viscous medium from the grease chamber is undesirable, because when there is loss of the medium in the grease chamber, the damping properties of the medium in respect to the planetary gear system deteriorate.

DE 35 15 928 C2 describes another flywheel device with two centrifugal masses that are movable relative to one another. The output-side centrifugal mass accommodates a grease chamber, into which engages a load-transmitter in the form of a hub disk attached firmly to the drive-side flywheel mass. The grease chamber is sealed relative to the output-side centrifugal mass by an O-ring. Because this O-ring must absorb all movements of the two centrifugal masses relative to one another, due to its frictional connection to the latter, it is subject to heavy wear.

SUMMARY OF THE INVENTION

Accordingly, it is an object of the present invention to provide a flywheel device which has two centrifugal masses rotatable relative to one another and a grease chamber that is sealed so that there is freedom from wear and leaking of viscous medium from the grease chamber.

Pursuant to this object, and others which will become apparent hereafter, one aspect of the present invention resides in a flywheel device having a drive-side first centrifugal mass and a second centrifugal mass rotatable relative to the first. Torsional dampening means are provided to connect the second centrifugal mass to the first centrifugal mass. At least one of the centrifugal masses has a grease chamber that contains a viscous medium and which at least partially accommodates the torsional dampening means. Seal means are provided to hold back the viscous medium in the grease chamber. The seal is mounted on the second centrifugal mass so as to radially extend into the grease chamber to a radial extension area of the first centrifugal mass. The seal has a side which is accessible to the viscous medium, which side is offset relative to the side of the wall of the centrifugal mass facing the grease chamber. The offset is limited, at least at the sealing point, to the gap width. The measure of running the seal to the gap width up to the associated wall of the centrifugal mass having the grease chamber, achieves the freedom from friction called for by the object of the invention, because the seal does not come to rest against this wall in a frictional-locking manner. In order to prevent viscous medium from emerging from the grease chamber, despite the gap which remains, the seal is arranged with an axial misalignment relative to the associated wall of the centrifugal mass. The seal has an area of radial overlap with the centrifugal mass and thus with the associated wall, so that the gap is advantageously formed substantially axially between the seal and the wall. The seal thus serves as a shield for the viscous medium being sprayed from different directions, which upon hitting the seal, is fed back into the grease chamber, thanks to an appropriate seal design, and in this way the medium can be prevented from making its way to the gap. The farther the seal is (seen in the axial direction) from the spraying point, for example, from the toothed gears of a planetary gear arranged in the grease chamber, the more effective this measure is, because an especially viscous medium that is sprayed in the direction of the seal, as the result of axial displacement in the meshing region when the toothed gears roll rapidly against one another has largely lost its kinetic energy before it comes into the extension area of the seal.

In another embodiment of the invention the side of the seal accessible to the viscous medium is set back from the side of the wall of the centrifugal mass facing the grease chamber. This ensures that viscous medium which--for example, when the flywheel device is shut down--flows downward from the higher areas of the flywheel device in the direction of the rotating axis to an edge which is created on the wall of the centrifugal mass at the radially inward edge due to the misaligned arrangement of the seal and forms a drain-off aid. Thus, even this medium can be passed by the point where the gap extends and therefore can be kept from emerging from the grease chamber. Preferably, this is carried out by providing the wall of the centrifugal mass facing the seal with an axial depression into which the seal can be sunk.

Pursuant to a further embodiment of the invention the seal has a flange part that runs substantially radially outward in a disk-shaped fashion. The flange part has a bent portion at its radially out perimeter. The bent portion is angled toward the associated wall of the centrifugal mass and serves as a guide edge for any viscous medium which, in spite of all of the measures described above, has been able to come close to the gap and is now conducted back along the angled part in the direction of the grease chamber. In contrast, in another embodiment of the invention, the perimeter edge of the depression in the wall has a radial taper which ensures that viscous medium, which is forced in the axial direction out of the meshing region between the sun gear and the planetary gears, due to the rotary movement of the toothed gears, and is conducted up to the seal, as soon as it moved radially outward because of centrifugal force during operation of the flywheel device, is guided in the direction of the grease chamber by the tapered perimeter edge of the depression. The taper of the edge is along a predetermined angle relative to the center axis of the centrifugal masses.

According to an additional embodiment of the invention, the seal has a bearing part that annularly encompasses the hub of the other centrifugal mass and can be securely clamped between the primary plate and the hub of the centrifugal mass. In this way the seal can be positioned using extremely simple means between the two centrifugal masses, with the seal preferably being non-rotatable relative to one of the centrifugal masses, but movable relative to the other.

In still another embodiment, a torsional damping device connects one of the centrifugal masses to at least one moment-transmitting element of a gearing between the two centrifugal masses. The gearing includes at least one planetary gear on at least one planetary carrier. The planetary gear is engaged on one side with a sun gear and on the other side with an internal gear. The seal is mounted radially inside the meshing region of the sun gear and the planetary gear and extends radially outward across this meshing region. The gap (seen in the radial direction) runs out of that region where, when the planetary gears roll upon the sun gear, viscous medium is axially displaced from the meshing region in the direction of the seal. As a result, it is ensured that even if a portion of this displaced medium hits the seal with kinetic energy that remains high, emergence from the grease chamber can effectively be prevented, because by means of a suitable design of the seal or the associated wall, as discussed previously, for example, this medium can be conducted so that it cannot penetrate into the gap between the wall and the seal.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 2 is an enlarged drawing of the seal, with the latter inclined in the radially outer area toward the associated wall of the centrifugal mass;

FIG. 3 is a view similar to FIG. 2, with different axial fixation of the seal; and FIG. 4 is an enlarged view of a seal as in FIG. 1, but with the inclined area of the associated wall.

DETAILED DESCRIPTION OF THE PREFERRED EMBODIMENTS

Figure 1:
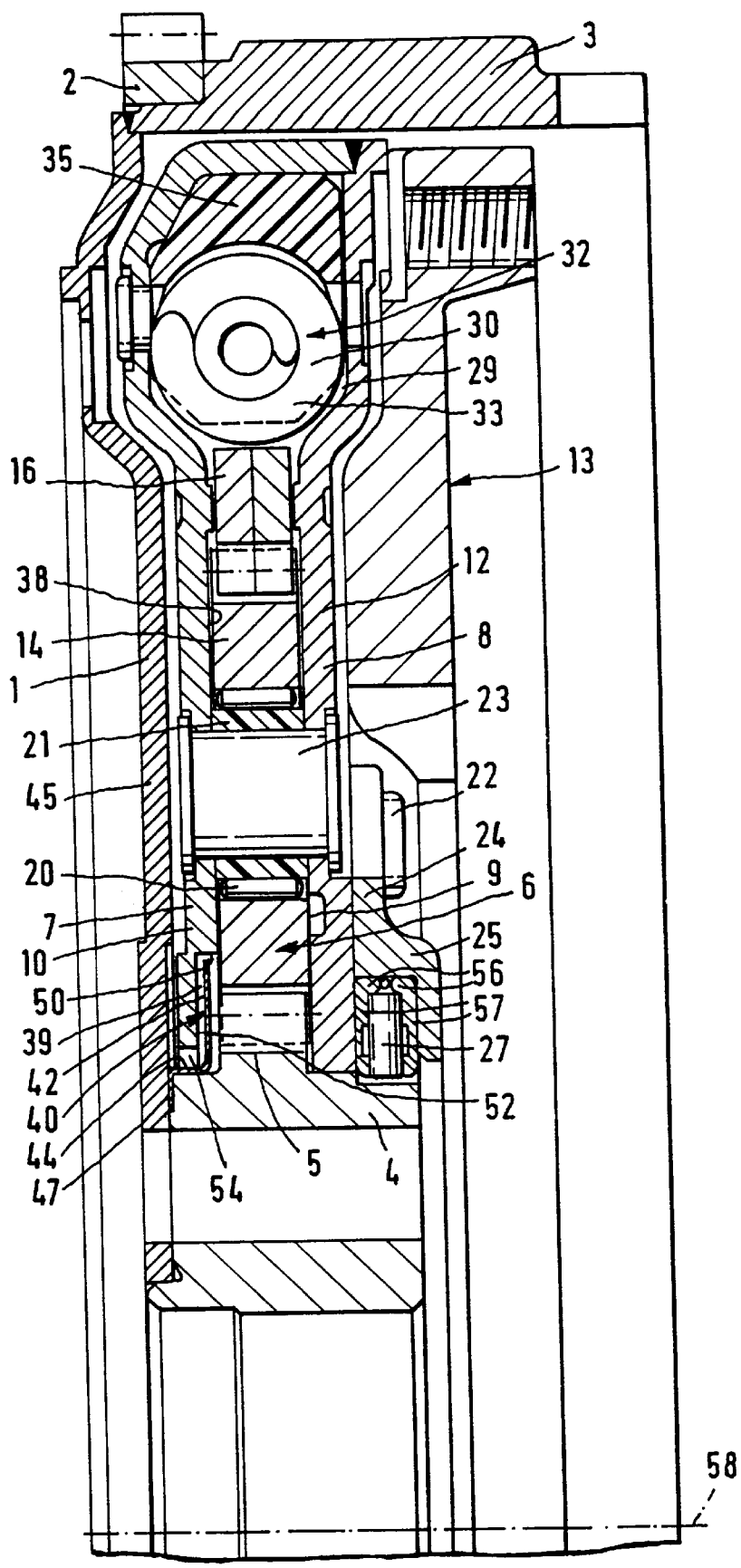
FIG. 1 is a cross-section of a flywheel device with two centrifugal masses rotatable relative to one another, one of which has a grease chamber, with which a seal is associated, pursuant to the present invention.

FIG. 1 shows a flywheel device, which on its left-hand side has a drive-side centrifugal mass 1 with a primary plate 45 running substantially radially outward. The flywheel device also has, in the perimeter area on an axial ring 3, a toothed ring 2 for a starter motor pinion (not shown). The primary plate 45 is attached to a hub 4, which can be located on a crank shaft (not shown) of an internal combustion engine and carries in a rotation-proof manner a sun gear 5 of a planetary gear system 6. The planetary gear system 6 has two planetary carriers 7, 8, one arranged on each side of the sun gear 5, which act as walls 10, 12 of an output-side centrifugal mass 13 and border a grease chamber 9 in the axial direction. The grease chamber 9 accommodates planetary gears 14, which have teeth that engage with the sun gear 5, as well as an internal gear 16, which in turn is connected via its teeth to the planetary gears 14. The aforementioned planetary carriers 7, 8 are provided with a plurality of bearings 20 arranged at equal diameters, e.g., needle bearings, on each of which is arranged one of the planetary gears 14. Furthermore, the planetary carriers 7, 8 are held at a fixed distance to one another in the axial direction by sleeves 21 and are drawn firmly against the two ends of each respective sleeve 21 by rivets 23 arranged in the sleeves 21. Further rivets 22 connect a disk 24 in a non-rotatable manner to the planetary carrier 8, which faces away from the drive-side centrifugal mass 1. A shoulder 25 molded onto the disk 24 comes to rest on a bearing 27, e.g., a roller bearing, on the side facing away from the planetary carrier 8. Via this bearing 27, the output-side centrifugal mass 13 is mounted so as to be rotatable relative to the drive-side centrifugal mass 1. In addition, the aforementioned internal gear 16 has recesses 29 at predetermined angular distances to one another, which are located radially outside of the meshing region of the aforementioned internal gear 16 with the planetary gears 14. In each of the respective recesses 29 is placed a spring device 30 of a torsional vibration damper 32. The vibration damper 32 has a plurality of springs 33 connected to one another in a known manner by sliding shoes 35, for example, as disclosed in DE 41 28 868 A1. One end of the spring device 30 rests on the internal gear 16 and the other end rests on the planetary carriers 7 and 8; specifically, via control means that are not shown. The spring device 30 is located in the axial direction between the two planetary carriers 7, 8, which are fixedly connected to one another in the radially outer area and secure the toothed gears 14, 16 in the axial direction.

As mentioned above, the planetary carriers 7, 8 border, as the walls 10, 12, the grease chamber 9, which is at least partially filled with viscous medium. The viscous medium is prevented from emerging out of the grease chamber 9 as follows: On the left-hand side in FIG. 1, the wall 10 of the output-side centrifugal mass 13 has in a radially inner area a ring-shaped depression 39 which, seen from the grease chamber 9, is set back relative to the side 38 of the wall 10 that faces the toothed gears 14, 16 and runs radially further outward. The depression 39 serves to accommodate a seal 40 which has a flange part 42 running essentially radially outward, a bearing part 44 annularly encompassing the hub 4, and a radially-inwardly-directed clamping part 47 gripped between the primary plate 45 and the hub 4. The seal 40 is formed by a thin metal sheet which is located at a gap width distance from the radial perimeter edge 50 of the depression 39 and also from the bordering wall 52 of the depression 39 facing the flange part 42. In contrast, the side of the seal 42 facing the toothed gears 5, 14 is at a considerably greater distance, compared to the aforementioned gaps, to the toothed gears 5 and 14.

The wall 10 of the output-side centrifugal mass 13 ends in the radially inner region at a distance from the hub 4, so that the remaining annular opening 54 permits the passage of the bearing part 44 of the seal 40. Between the primary plate 45 of the drive-side centrifugal mass 1 and its hub 4, the seal 40 is preferably held via its clamping part 47 in a rotation-proof manner.

In contrast to the wall 10, the wall 12 on the other side of the toothed gears 5, 14 and 16 runs radially up to the hub 4 and encompasses, in the radially inner area between itself and the shoulder 25 of the disk 24, a two-part bearing shield 56. The main function of the bearing shield 56 is to hold back any viscous medium that may have come through a gap between the radial inner side of the wall 12 and the hub 4 from passing through the bearing 27 and thus emerging from the flywheel device. At the bearing shield 56, which is held radially between the disk 24 and an outer bearing ring (not shown) of the bearing 27, annular arms 57 are provided on both sides of the bearing 27, which reach up to the sides of a radially inner bearing ring (also not shown) and are pressed against the latter at pre-determinable stress. In this way, the aforementioned sealing function of the bearing 27 is carried out via the arms 57.

The operation of the inventive flywheel device will next be described.

Upon the initiation of a torque, which when an internal combustion engine is used as the drive is overlaid with torsional vibrations, to the centrifugal mass 1, the movement caused by this is passed to the sun gear 5, which because of its meshing with the planetary gears 14 drives the planetary gears 14. While the torque is passed on via the planetary gears 14 to the planetary carriers 7, 8 and thus to the output-side centrifugal mass 13 without any change in direction of rotation, the torsional vibration damper 32 ensures a corresponding reduction in the torsional vibration that accompanies the torque. Because the planetary carriers 7, 8, due to their inertia, initially continue to act in a rotation-proof manner, the movement of the sun gear 5 is converted into a rotation of the planetary gears 14 around the respective bearings 20 as well as into a movement of the bearings 20 themselves and of the internal gear 16 around the rotational axis 58 of the flywheel device. In this way, the moment associated with the torsional vibration is divided up into, specifically, a first partial moment that passes via the planetary gears 14 to the planetary carriers 7, 8 and a second partial moment that is transmitted to the internal gear 16. If the moment associated with the torsional vibration initiated at the sun gear 5 is oriented in clockwise direction (for example, according to FIG. 1), then a first partial moment acting in the counterclockwise direction causes, via the rotation of the planetary gears 14, the internal gear 16 to move out of its resting position, while the planetary carriers 7, 8 are driven by a second partial moment acting in the clockwise direction. As a result, a relative movement is created between the planetary carriers 7, 8 and the internal gear 16, whereby the spring device 30 supported on the control means (not shown) of the internal gear 16 and the planetary carriers 7, 8 and, because of this, also the sliding shoes 35 move along their guide path. The distance of the deformation path of the spring device 30 understandably depends on the gear ratio of the planetary gear system 6 and thus on the ratio of the tooth counts of the sun gear 5 and the internal gear 16. Based on this translation ratio, the counteracting partial moments at the internal gear 16 and planetary carriers 7, 8 can be larger than the drive-side moment; however, when overlaid with one another, the result is an output-side moment corresponding to the drive-side moment. Of course, the output-side moment is largely free of variations in the constant velocity, compared to the drive-side moment, because of the operation of the flywheel device described above.

Since the chamber 9 in the output-side centrifugal mass 13 is filled with viscous medium, the viscous medium is forced between the sun gear 5 and the internal gear 16 when the planetary gears 14 roll off on one another as described, as well as during the deformation of the spring devices 30. When the teeth mesh, viscous medium in the area of the teeth is forced in the axial direction, where it encounters the inner sides of the planetary carriers 7, 8 facing the toothed gears 14, 16 and, because of the rotational movement of the centrifugal masses 1, 13, is carried away radially outward. When the springs 33 are deformed and the sliding shoes 35 therefore approach one another, the viscous medium is also forced out in the direction of the inner sides of the planetary carriers 7, 8. As the displacement speed of the planetary carriers 7, 8 increases, the speed at which the viscous medium is displaced increases as well, both in the meshing regions and in the region of the spring device 30. As a result, of course, the resistance of the medium to displacement also increases. Because of this, the damping brought about by the medium is dependent on the particular angular speed at which the planetary carriers 7, 8 move relative to the internal gear 16.

As mentioned above, the roll-off movement of the toothed gears on one another makes it possible for any viscous medium located between the teeth to be forced out in the axial direction. Unlike in the region radially outside the depression 39 in the planetary carrier 7, the side 38 of the carrier 7 facing the toothed gears 14, 16 is brought near to these toothed gears, up to gap width, which is hit by the axially displaced medium with relatively great kinetic energy. The depression 39 and the misaligned arrangement of the flange part 42 of the seal 40 create a sufficiently large distance between the seal 40 and the associated toothed gears 5 and 14, so that the kinetic energy, which causes the axially displaced medium to be sprayed away, is already largely dissipated before the medium reaches the flange part 42 of the seal 40. For this medium that encounters the seal 40, the flange part 42 acts as a shield, on which, depending on the operational phase, the medium is passed on radially inward or radially outward. This is illustrated, for example, by the upper half of the flywheel device shown in FIG. 1. In the event that, after the viscous medium has hit directly against the flange part 42, the drive and thus the flywheel device are brought to a halt, the viscous medium can run, due to gravity, radially inward along the side 38 of the wall 10, until it is brought to a stop in the outer region of the hub 4, at the latest, in a region where the bearing part 44 passes over into the clamping part 47. When operation of the flywheel device continues after the medium has hit the flange part 42, the medium flows, due to centrifugal force, radially outward on the flange part 42, collects on the perimeter edge 50 of the depression 39, and is transported radially outward because of, among other factors, the rotation of the planetary gears 14. The assurance that the medium will take this path is made even greater by the fact that (as shown in FIG. 4) the perimeter edge 50' has a radial broadening in the direction of the toothed gears 14 at a pre-determinable angle relative to the axis of rotation 58, so that the medium, due to the centrifugal force, is necessarily transported radially outward away from the seal 40.

The seal 40' in FIG. 2 differs from that in FIG. 1 only in that the flange part 42 has a bent portion 60 in the radial region of its outer perimeter, which portion 60 is bent toward the bordering wall 52 of the depression 39. Because of this bend, the gap between the radially outer end of the flange part 42 and the respective associated wall 50, 52 is of minimal design both in the radial direction and in the axial direction, so that the best possible protection against the emergence of viscous medium is established. In addition, the viscous medium that runs from the radial outside to the radial inside when the flywheel device is shut down, will separate itself from the perimeter edge 50 of the depression 39 acting as a drain-off edge and, dropping onto the bent portion 60, will be passed in the direction of the grease chamber 9.

The seal 40' in FIG. 3 also has, in the radially outer region, a portion 60 bent toward the planetary carrier 7. However, in the radially inner area it is designed without the clamping part 47. Instead, the bearing part 44 is firmly clamped axially between a shoulder 62 and the primary plate 45. Otherwise, its functioning corresponds to that of the above-described embodiment of the seal 40'.

The seal 40' in the illustrated embodiments is described in reference to a flywheel device that has a planetary gear system 6 in its grease chamber 9. Of course, a seal of this type can also be used in a conventional flywheel device, in which, instead of the planetary gear system, there is a hub disk attached to an centrifugal mass, which extends into the grease chamber formed in the other centrifugal mass, whereby a spring device acts in the perimeter direction between the two centrifugal masses that rests at one end, for example, on protrusions of the walls of the grease chamber and at the other end on the aforementioned load-transmitter. As an example of a conventional flywheel device of this type, but without the seal 40 according to the invention, reference is made to that depicted and described in the aforementioned DE 35 15 928 C2.

The invention is not limited by the embodiments described above which are presented as examples only but can be modified in various ways within the scope of protection defined by the appended patent claims.

I claim:

1. A flywheel device, comprising: a drive-side first centrifugal mass; a second centrifugal mass rotatable relative to the first centrifugal means; torsional damping means for connecting the second centrifugal mass to the first centrifugal mass; a grease chamber arranged in the second centrifugal mass for at least partially accommodating the torsional damping means, the grease chamber containing a viscous medium; and seal means associated with the grease chamber for holding the viscous medium in the grease chamber, the seal means including a seal mounted on the first centrifugal mass so as to radially extend to a radial extension area of the second centrifugal mass so as to have a side accessible to the viscous medium, the side accessible to the viscous medium having an axial offset relative to a side wall of the second centrifugal mass facing the grease chamber and acting together with the seal, the offset being limited, at least at a sealing point, to a gap width of a radial perimeter edge of the seal to an opposing surface of the second centrifugal mass having the grease chamber, the wall of the second centrifugal mass associated with the seal having an axial depression configured to accommodate the seal.

2. A flywheel device, comprising: a drive-side first centrifugal mass; a second centrifugal mass rotatable relative to the first centrifugal means; torsional damping means for connecting the second centrifugal mass to the first centrifugal mass; a grease chamber arranged in the second centrifugal mass for at least partially accommodating the torsional damping means, the grease chamber containing a viscous medium; and seal means associated with the grease chamber for holding the viscous medium in the grease chamber, the seal means including a seal mounted on the first centrifugal mass so as to radially extend to a radial extension area of the second centrifugal mass so as to have a side accessible to the viscous medium, the side accessible to the viscous medium having an axial offset relative to a side wall of the second centrifugal mass facing the grease chamber and acting together with the seal, the offset being limited, at least at a sealing point, to a gap width of a radial perimeter edge of the seal to an opposing surface of the second centrifugal mass having the grease chamber, the wall of the second centrifugal mass associated with the seal having an axial depression configured to accommodate the seal, the seal having a flange part configured to run substantially radially outward in a disk-shaped fashion, the flange part having a radially outer perimeter region that is bent toward the wall of the second centrifugal mass.

3. A flywheel device, comprising: a drive-side first centrifugal mass; a second centrifugal mass rotatable relative to the first centrifugal means; torsional damping means for connecting the second centrifugal mass to the first centrifugal mass; a grease chamber arranged in the second centrifugal mass for at least partially accommodating the torsional damping means, the grease chamber containing a viscous medium; and seal means associated with the grease chamber for holding the viscous medium in the grease chamber, the seal means including a seal mounted on the first centrifugal mass so as to radially extend to a radial extension area of the second centrifugal mass so as to have a side accessible to the viscous medium, the side accessible to the viscous medium having an axial offset relative to a side wall of the second centrifugal mass facing the grease chamber and acting together with the seal, the offset being limited, at least at a sealing point, to a gap width of a radial perimeter edge of the seal to an opposing surface of the second centrifugal mass having the grease chamber, the wall of the second centrifugal mass associated with the seal having an axial depression configured to accommodate the seal and have a perimeter edge, the seal having a flange part configured to run substantially radially outward in a disk-shaped fashion at the gap width from the perimeter edge of the depression, the perimeter edge of the depression being angled radially outwardly in the direction of the grease chamber along a pre-determinable angle relative to a center axis of the centrifugal masses.

4. A flywheel device, comprising: a drive-side first centrifugal mass including a hub and a plate; a second centrifugal mass rotatable relative to the first centrifugal means, torsional damping means for connecting the second centrifugal mass to the first centrifugal mass; a grease chamber arranged in the second centrifugal mass for at least partially accommodating the torsional damping means, the grease chamber containing a viscous medium; and seal means associated with the grease chamber for holding the viscous medium in the grease chamber, the seal means including a seal mounted on the first centrifugal mass so as to radially extend to a radial extension area of the second centrifugal mass so as to have a side accessible to the viscous medium, the side accessible to the viscous medium having an axial offset relative to a side wall of the second centrifugal mass facing the grease chamber and acting together with the seal, the offset being limited, at least at a sealing point, to a gap width of a radial perimeter edge of the seal to an opposing surface of the second centrifugal mass having the grease chamber, the wall of the second centrifugal mass associated with the seal having an axial depression configured to accommodate the seal, the seal including a bearing part configured to annularly encompass the hub of the first centrifugal mass, the bearing part being clamped between the hub and the plate of the first centrifugal mass which are clampable with one another in an axial direction.

5. A flywheel device, comprising: a drive-side first centrifugal mass; a second centrifugal mass rotatable relative to the first centrifugal means; torsional damping means for connecting the second centrifugal mass to the first centrifugal mass; a grease chamber arranged in the second centrifugal mass for at least partially accommodating the torsional damping means, the grease chamber containing a viscous medium; seal means associated with the grease chamber for holding the viscous medium in the grease chamber, the seal means including a seal mounted on the first centrifugal mass so as to radially extend to a radial extension area of the second centrifugal mass so as to have a side accessible to the viscous medium, the side accessible to the viscous medium having an axial offset relative to a side wall of the second centrifugal mass facing the grease chamber and acting together with the seal, the offset being limited, at least at a sealing point, to a gap width of a radial perimeter edge of the seal to an opposing surface of the second centrifugal mass having the grease chamber, the wall of the second centrifugal mass associated with the seal having an axial depression configured to accommodate the seal; and a gearing effective between the centrifugal masses and including at least one moment transmitting element, the torsional damping means connecting at least one of the centrifugal masses to the at least one moment-transmitting element of the gearing effective between the two centrifugal masses, the gearing including at least one planetary carrier having at least one planetary gear which is engaged on one side with a sun gear and on another side with an internal gear, the seal being mounted radially inside a meshing region of the sun gear and the planetary gear so as to extend radially outward across this meshing region.

* * * * *